United States Patent [19]

Summach et al.

[11] Patent Number: 4,821,809
[45] Date of Patent: Apr. 18, 1989

[54] MULTIPLE SECTION DRAWBAR

[75] Inventors: Terry Summach; Glen S. Pask, both of Saskatoon; Dennis Summach, Asquith; William Newton, Aberdeen, all of Canada

[73] Assignee: Flexi-Coil Limited, Saskatoon, Canada

[21] Appl. No.: 632,279

[22] Filed: Jul. 20, 1984

Related U.S. Application Data

[63] Continuation of Ser. No. 531,624, Sep. 12, 1983, abandoned, which is a continuation of Ser. No. 351,175, Feb. 22, 1982, abandoned, which is a continuation of Ser. No. 174,167, Aug. 18, 1980.

[30] Foreign Application Priority Data

Aug. 17, 1979 [CA] Canada ................................. 334034

[51] Int. Cl.$^4$ ........................ A01B 49/02; A01B 73/06
[52] U.S. Cl. .................................... 172/179; 172/198; 172/311; 172/776
[58] Field of Search ............... 172/142, 177, 179, 198, 172/311, 446, 456, 662, 776

[56] References Cited

U.S. PATENT DOCUMENTS

| | | | |
|---|---|---|---|
| 2,970,658 | 2/1961 | Kopaska | 172/456 |
| 3,539,016 | 11/1970 | Bauer et al. | 172/311 |
| 3,592,271 | 7/1971 | Schneider | 172/776 X |
| 3,640,345 | 2/1972 | Sosalla | 172/311 |
| 3,700,040 | 10/1972 | Sosalla et al. | 172/311 |

FOREIGN PATENT DOCUMENTS 838417 4/1970 Canada ................................ 172/662

OTHER PUBLICATIONS

"Lindsay Soil Preparation Equipment", Lindsay Bros. Co., Minneapolis, Minnesota 55401, Feb. 1977.

Primary Examiner—Richard T. Stouffer
Attorney, Agent, or Firm—D. Ron Morrison; Alfred E. Miller

[57] ABSTRACT

A drawbar having a boom with at least two pivotally connected sections which in a field position extend generally transversely of the direction in which the draw is drawn. Each section carries at least one first soil working device and at least one other second soil working device is trailed behind said first soil working device. The sections are pivotable in unison, about a horizontal axis transverse to the direction in which the drawbar is drawn, from said field position to a non-working position. In the non-working position the soil working devices are raised in order that the sections can be pivoted relatively to each other to a folded, transport position.

58 Claims, 3 Drawing Sheets

MULTIPLE SECTION DRAWBAR

This application is a continuation of Ser. No. 531,624 filed Sept. 12, 1983, now abandoned, which is a continuation of Ser. No. 351,175, filed Feb. 22, 1982, now abandoned, and which is a continuation of now abandoned Ser. No. 179,164 filed Aug. 18, 1980 claiming foreign priority of Aug. 17, 1979.

This invention is concerned with an agricultural drawbar made up of at least two sections which are movable between a deployed, field or working position and a transport position.

Such drawbars are commonly used where large fields or areas are to be worked as, for example, in the North American Prairies and provide the advantage that in the deployed position large swaths of land may be worked, while in the folded position, the drawbar may be transported along relatively narrow roadways to storage or to another area to be worked.

In such farming areas beneficial results can be achieved by performing multiple farming operations, such as harrowing and packing, in a single operation. These results include, inter alia, reduction in wind erosion, evaporation and the number of passes of equipment over the land. To this end it is known to couple two different soil working devices in tandem behind a tractor. With some combinations of soil working devices such as harrows and packers, transportation has been a problem and in the past it has been necessary to transport the packers separately from the drawbar or it has been necessary to trail the packers along the roadway.

The present invention seeks to provide a unit by which two different types of soil working devices particularly but not necessarily exclusively, harrows and packers, may be coupled in tandem behind a tractor and be moved conveniently in a transport position with the implements out of contact with the ground.

According to the present invention there is provided a drawbar comprising a boom having at least two sections both or each of said sections having means for supporting at least one first soil working device, coupling means for connecting said boom to a tractor, means for pivoting said sections, in unison, about a horizontal axis transverse to the direction of travel of said implement, from a working position to a raised, non-working position and means for pivotally connecting second soil working devices to both or each of said sections at locations spaced from said axis such that, in said non-working position of said sections, second working devices connected to said sections will be lifted from the ground, said sections being pivotally connected to each other about an axis or axes which, in said non-working position, is or are generally upright, to be movable between a deployed attitude in which they lie substantially normal to the direction of travel and a folded, transport position. Preferably, the means for pivotally connecting the second working devices are disposed to permit those second working devices to be trailed behind the first working devices when deployed in field position.

Most desirably, the drawbar comprises a centre boom section and wing boom sections, each wing section being pivotally connected to the centre section and being movable to a folded attitude in which it lies substantially parallel to the direction of travel of the implement. The wing sections may in fact comprise two or more pivotally interconnected subsections movable in unison to the folded attitude.

In such an arrangement it is desirable that the second working devices, when coupled to the means for pivotally connecting them to the boom sections, are, in said non-working attitude, lifted clear of the ground.

In one embodiment of the invention the first working devices comprise harrows and the second working devices comprise packers, the harrows being mounted on frame elements extending rearwardly from the boom sections and the packers having tongues pivotally connected the ends of the frame elements remote from the drawbar by connecting to elements so that as the draw bar is moved to the non-working position, the packers hang suspended from the frame elements.

Also according to the present invention there is provided a farm implement harrow and packer drawbar comprising a boom having a centre section and wing sections, each wing section having an inboard and an outboard end, torque transmitting universal pivot means connecting the inboard end of the wing section to the centre section, the centre section and the wing sections each having a plurality of fore and aft extending frame elements, each frame element having means for supporting a harrow and each frame element having a packer tongue pivotally secured thereto and adapted to trail a packer behind said frame element, coupling means for coupling the boom to a tractor, said centre section being connected to said means for coupling the boom to a tractor for pivoting movement about a generally horizontal axis transverse to the direction of travel of said drawbar, means for rotating said centre section and with it said wing sections, about said axis between a working position, in which said frame element are generally horizontal, and a non-working position in which said frame elements are generally upright, each said tongue means being pivotally connected to its associated frame element at a location spaced from said axis, wheel means supporting said boom in working, non-working and transport positions, releasable means maintaining said wing sections generally normal to the direction of travel of said drawbar, said releasable means being operable to permit said wing sections to pivot rearwardly relative to said centre section from the non-working position to the transport position.

To achieve complete coverage of the working width of the drawbar by the packers, even as the tractor and drawbar execute a turn, it is preferred that the lateral and regions of adjacent packers overlap in the working or field position. To this end adjacent one of the packers are trailed at different distances behind the tractor. This can be effected by the expedient of having the packer tongues connected to the frame elements by connecting elements of which alternate ones are of a first length and the remaining ones are of a second and different length. Another expedient is to have alternate ones of the frame elements of a first length and the remaining frame elements of a second and different length. Most preferably these two expedients are combined with shorter packer tongues being connected to shorter ones of the frame elements.

A preferred embodiment of the present invention is illustrated in the accompanying drawings in which.

Figures 1, 2:
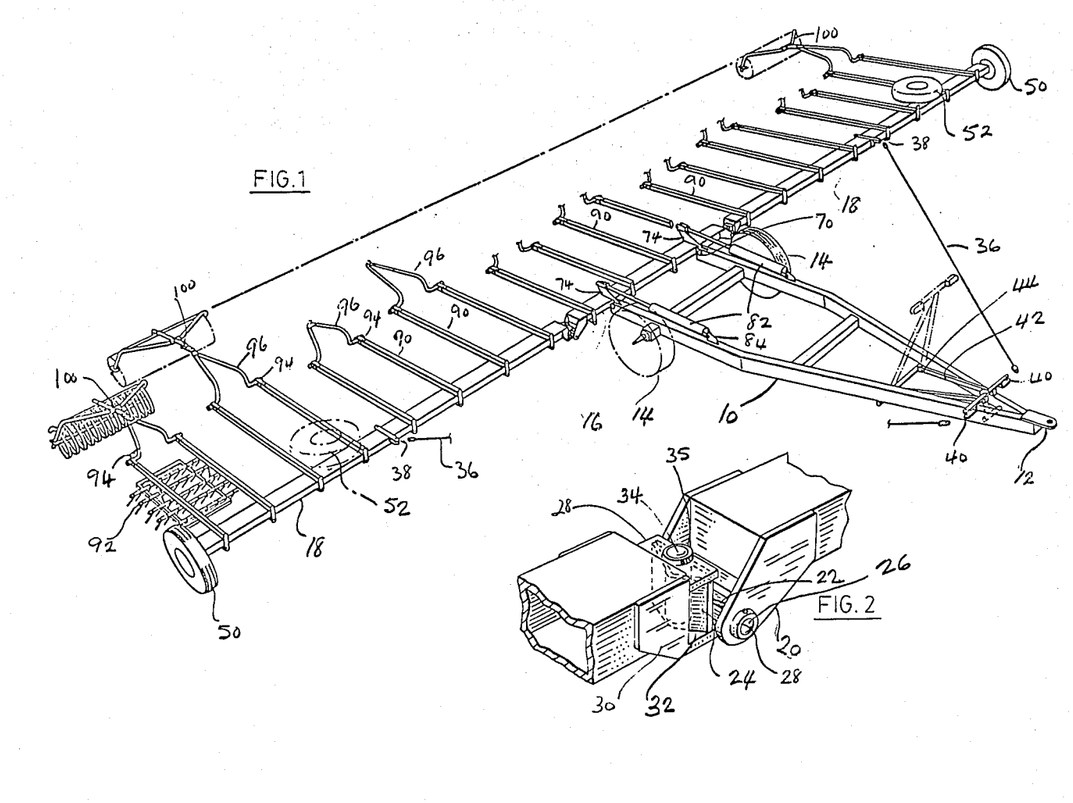
FIG. 1 is a perspective view of a drawbar according to the present invention in field or working position with parts removed in the interests of clarity.
FIG. 2 is a detail of the structure of FIG. 1.

A preferred drawbar according to the present invention is illustrated, in the working or field position, in FIG. 1. The drawbar comprises a cart at 10 of largely conventional structure having a hitch at 12 by which it may be coupled to a tractor the cart and hitch constituting, as will be apparent from the following description, means by which the boom of the drawbar may be coupled to the tractor. The cart has ground-engaging wheels 14 and is connected to a centre section 16 of a draw bar boom which comprises that centre section and a pair of outboard wing boom sections 18. The wing sections are connected to the centre section by the hinge structure illustrated in FIG. 2, that hinge structure constituting a torque transmitting univerasal pivot connecting the wing sections to the centre section. Referring to FIG. 2, the centre section of the drawbar, in the working position shown in FIGS. 1 and 2, has a pair of downwardly and outwardly extending bracket arms 20 between which a pivot block 24 is disposed. The pivot block comprises perpendicular channels 22 and 32 with a pin 26 being passed through channel 22 and being engaged in bearings 28 of the brackets 20.

At the inboard end of the wing section, i.e. the end of the wing section adjacent to the centre section, a U-shaped hinge bracket 28 is supported and is reinforced by fillets 30. Pivot pin 34 is supported in channel 32 and extends between the opposed limbs of the U-shaped bracket 28 and is received in bearings 35. In this way the wing sections are universally hinged to the centre section in such a way that torque rotating the centre section about a longitudinal axis transverse to the direction of travel of the drawbar is transmitted to the wing sections.

Stays 36 extend between anchor points 38 on the wing sections and anchor points 40 of a pivotally mounted, generally T-shaped, control or locking arm 42 of the cart 10. Arm 42 is pivoted, as at 44, to move between the positions shown in full line and in chain-dot line in FIG. 1. Latching means, operable form the tractor, retain the arm 42 in the position shown in full line, those latching means co-operating with the base of the T-shaped arm. Release of arm 42 permits pivoting movement of the wing sections to the position shown in chain-dot line in FIG. 3, this in a manner described more fully hereinafter.

Mounted at the distal or outboard ends of the wing sections of the boom are support wheels 50 rotating upon fixed axle means. Disposed upon the wing sections intermediate their pivotal connection to the centre section and the wheels 50 are support wheels 52 which, in a manner described hereinafter, support the wing sections in the non-working positions and during transportation, i.e. support the wing sections in the folded or transport position. The wheels 52 are mounted upon a fixed axle indicated generally at 54.

The draw bar boom is pivoted by its centre section, as at 70, to the adjacent end of the cart 10 and has a pair of spaced apart upstanding brackets 74 rigidly secured to it. A pair of piston/cylinder units 82 extend between anchor points 84 on the cart and a pivot on the brackets 74, actuation of the piston/cylinder units causing the centre section of the draw bar boom and with it, the wing sections of the draw bar boom, to be pivoted about a generally horizontal axis transverse to the direction of travel of the tractor to which the cart is connected, and passing through the pivots 70.

Figures 4, 5, 6:
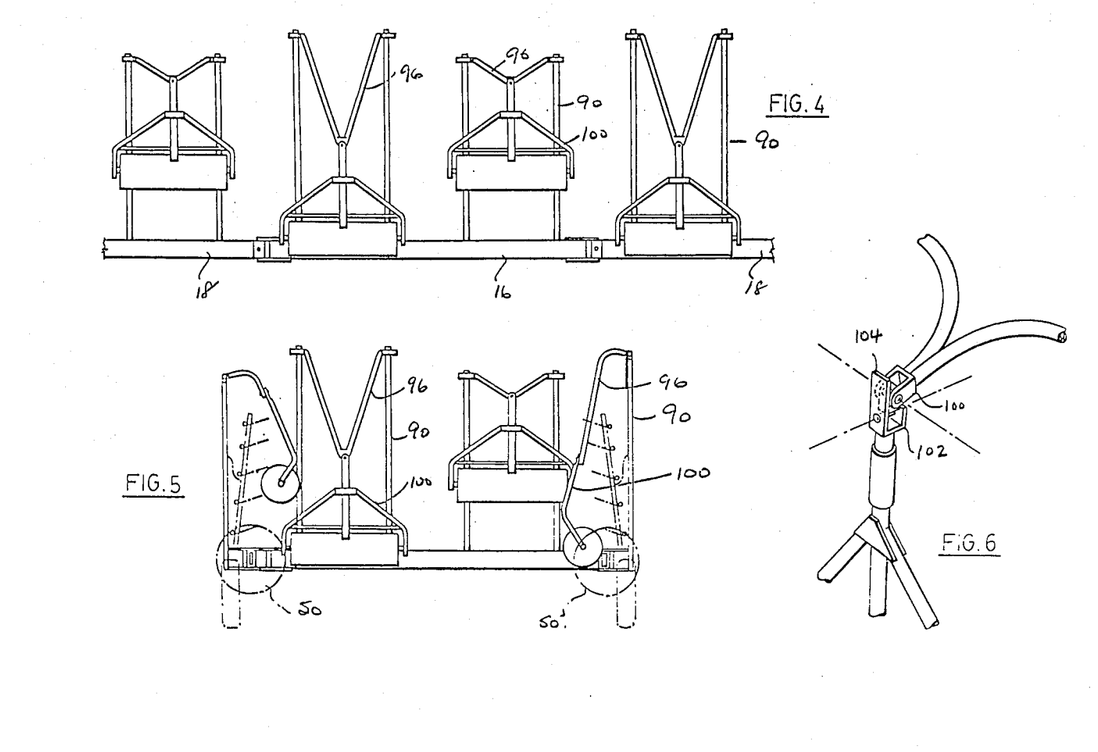
FIG. 4 is a rear view of a part of the structure in FIGS. 1 and 3, shown in the non-working position.
FIG. 5 is a view similar to FIG. 4 showing the implement in a folded or transport position.
FIG. 6 shows a detail of the drawbar of FIGS. 1 to 5.

Each of the sections has a plurality of generally rectangular frames 90 constituting frame elements, the wing sections each having four such frames and the centre section having two such frames. Suspended from each of the frames, are harrows 92 only one of which is illustrated, in the interests of clarity. At the end of each frame element remote from the boom a connecting element 96 provides a pivotal connection for a packer tongue to the frame. The connecting elements each comprise the structure 96 which is generally V-shaped, the distal ends of the limbs of the V being pivotally connected to the frame elements 90 as at 94. At the crotch of the V-shaped connecting elements, the packer elements, of known structure per se are connected by means of packer tongues 100 to the connecting elements as shown in FIG. 6. At the crotch of the connecting elements a clevis 101 is provided and under a terminal portion of the packer tongue has a clevis 102. A pair of pivot pins are disposed between the arms of the clevises and provide for pivoting movement of the packers about a vertical axis and for pivoting movement about another axis that is horizontal and transverse to the direction of travel of the drawbar. The terminal position of the packer tongue is rotatable about its own axis i.e. about a generally horizontal axis parallel to the direction of travel of the drawbar so that the packer tongue is pivoted to the connecting element for movement about three mutually perpendicular axes and the universal connection between the connecting elements and the packer tongue is non-torque transmitting. To prevent the connection between the connecting elements and the packer tongues for contacting the ground, the clevis 102 is extended as at 104 to act as a stop co-operating with the adjacent end of the connecting element. It is to be noted that alternate ones of the cross pieces across the draw bar are disposed at a particular distance from the draw bar and the remainder of those cross pieces are disposed at a lesser distance from the draw bar sections. Or, putting it another way alternate ones of the frame elements are a first length while the remaining frame elements are of a lesser length. Similarly, alternate ones of the tongues 96 are of a first length while the remaining tongues are of a second or lesser length, the shorter tongues being connected to the cross pieces of shorter ones of the frames and the longer tongues being connected to longer ones of the frames.

The frame 90 of the left hand draw bar section 18, as viewed in FIG. 1, nearest to the pivotal connection of that wing section to the centre section of the draw bar has a long tongue and is secured to a long frame whereas the adjacent frame 90 of the centre section has a short packer tongue. Further a long tongue structure is provided on the frame 90 at the right hand end of the centre section, that frame itself being a long frame, while the adjacent packer tongue of the right hand wing section is short and is connected to a short frame. By the adoption of the alternating long and short tongues it is possible to overlap the end sections of adjacent ones of the packer elements so that as the packers are trailed behind a tractor, as the tractor turns all of the land is covered by the packers even as the tractor is turned.

Figure 3:
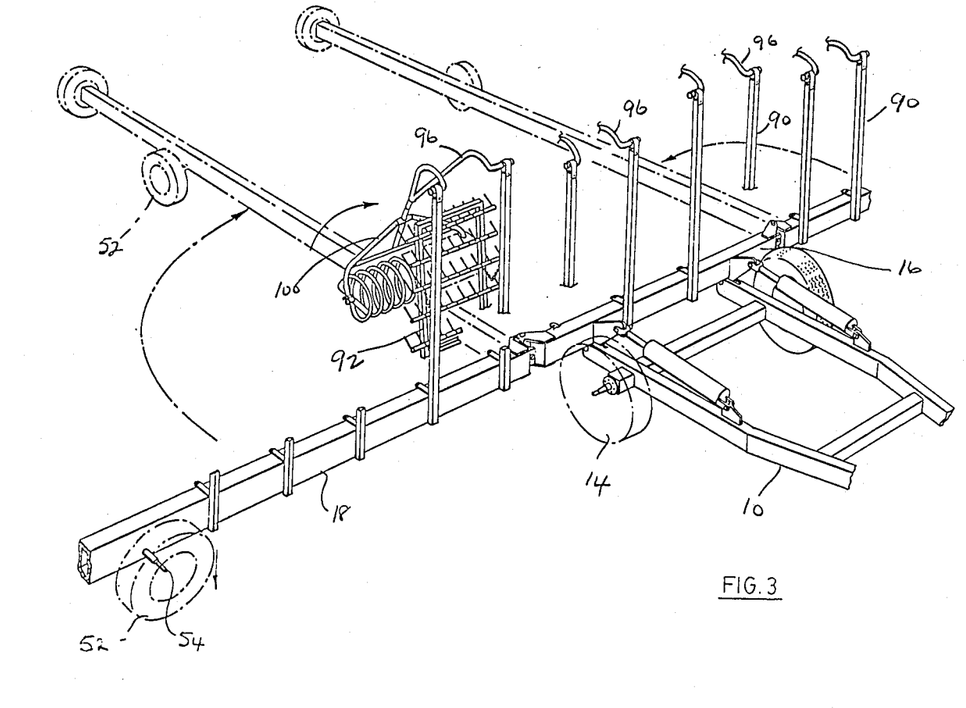
FIG. 3 is a perspective view of the structure in FIG. 1 showing the drawbar in a non-working position and, again, with parts removed in the interests of clarily.

In moving from the working position shown in FIG. 1 to the transport position shown in chain - dot line in FIG. 3 and also in FIG. 5, first the piston/cylinder units 82 are operated so that the boom sections move, in unison, with the frame elements 90 to the position shown in full line in FIG. 3, i.e. they move to a non-working position. In this non-working position the connecting elements which support the packers pivot to hang suspended as is particularly to be seen in FIG. 3.

In the upright position of the frame elements the wheels 52 are brought into contact with the ground and the latching means holding the control bar 42 is released. Thereafter as the tractor is advanced the wing sections, being free of restraint by the stays 36 pivot about what are now substantially vertical axes, from the position shown in full line in FIG. 3 to the transport position shown in chain-dot line in that Figure.

To move from the transport position to the working or field position the tractor is reversed so that the wing sections are moved to lie parallel to the centre section, i.e. the wing sections are moved to the position shown in full line in FIG. 3. Upon reaching that position, the piston/cylinder units 84 are operated so that the packer units come into contact with the ground and the wing sections are supported by the wheels 50. At this point the tractor is slowly driven forward while the piston/cylinder units 84 are operated to lower the frames and packers completely into the working position shown in FIG. 1.

During the lowering the frames from the position shown in full line in FIG. 3 to that position in FIG. 1 the control bar is lowered, under gravity, and engages with the latch means to be held in the downward, wing section restraining position.

It will be recognized that the embodiment here illustrated is subject to various modifications. For example, it is possible instead of using a centre section and two wing sections to use simply two sections which fold to adopt a substantially V-shaped configuration in the transport position or a configuration in which they lie parallel to the direction of travel. Additionally, the wing sections themselves may comprise two sections pivoted to each other to accommodate movements of the wing sections over undulating ground. Additionally, while in this particular embodiment there have been illustrated packers and harrows quite apparently the present invention is not restricted to these particular types of units.

The embodiments of the invention in which an exclusive property or privilege is claimed are defined as follows:

1. A drawbar adapted to be drawn across the ground comprising:
    (a) a three-section boom including a center section and two outer sections with pivotal connections between the adjacent boom sections and in which the two outer booms sections are substantially longer than the center boom section, said center section being generally transverse to the direction of travel of the drawbar,
    (b) ground engagable wheel means for supporting said boom sections out of contact with the ground,
    (c) first coupling means for coupling the center section of the boom to an associated tractor,
    (d) releasable second coupling means to couple the outer sections to the said first coupling means and retain said outer sections generally transverse to the direction of travel of the drawbar when in the working or field position and in the non-working position,
    (e) a plurality of frame members attached to each of said sections and directed generally rearwardly of said sections when in the field or working position,
    (f) a plurality of first soil working devices each attached to a said section by means of at least one of said frame members and adapted to be in contact with ground when in the field or working position,
    (g) a plurality of second soil working devices each attached to said frame members by a connecting means rearward of said first soil working devices and adapted to be in contact with the ground when in the field or working position,
        (i) each said connecting means including a rigid connecting member freely pivotally connected at its forward end to at least one of said frame members about a first horizontal axis transverse to the direction of travel of the drawbar in the field or working position,
        (ii) said connecting means also including a further free pivotal connection about an axis at its rearward end which is vertical when in the field or working position,
    (h) means for pivoting said boom sections about a horizontal boom axis, generally parallel to this length and forward of the said first soil working devices in the field or working position, to move said frame members between the working or field position in which said first soil working devices are adapted to be in contact with the ground and the non-working position in which said first soil working devices are adapted to be in a raised substantially upright position out of contact with the ground an in generally the same position relative to each other and the frame members,
        (i) said second soil working devices and said connecting means freely pivoting about said first horizontal axis to be lifted thereby from the ground and hang rearwardly of said first soil working devices, in said non-working position,
        (ii) said pivotal connections between said boom sections including axes which are generally upright when in the non-working position so that said outer sections may pivot about said axes upon release of said releasable second coupling means from a position transverse to the direction of travel of the drawbar in the non-working position to a position generally parallel to the direction of travel of the drawbar for transport.

2. A drawbar as claimed in claim 1 wherein the wheel means include a pair of wheels connected to each of said outer sections, one of which wheels is rotatable about an axis parallel to the length of said section and supports said section out of contact with the ground in the field or working position, the other of which wheels is rotatable about an axis transverse to the length of said section and supports said section out of contact with the ground in the non-working position and in the transport position.

3. A drawbar as claimed in claim 1 or wherein said connecting means also includes at its rearward end a further free pivotal connection about a second horizontal axis which is generally parallel to the direction of travel when in the working or field position.

4. A drawbar as claimed in claim 3 wherein said connecting means also includes a further free pivotal connection at its rearward end about a third horizontal axis which is generally transverse to the direction of travel when in the working or field position.

5. A drawbar as claimed in claim 4 wherein said free pivotal connection about said third axis includes means for restricting relative movement to prevent said connecting means from contacting the ground.

6. A drawbar as claimed in claims 1 or 2 wherein adjacent ones of said second soil working devices are trailed at different distances behind the associated boom to allow said second soil working devices to cover completely the working width of the drawbar.

7. A drawbar as claimed in claim 6 wherein alternate ones of said connecting means have a first length and the remaining ones are of a second and different length.

8. A drawbar as claimed in claim 6 wherein alternate ones of said frame members have a first length and the remaining ones are of a second and different length.

9. A drawbar as claimed in claim 8 wherein alternate ones of said connecting means have a first length and the remaining ones are of a second and different length and the shorter connecting means are connected to shorter ones of said frame members.

10. A harrow and packer drawbar adapted to be drawn across the ground comprising:
(a) a three-section boom including a center section and two outer sections with pivotal connections between the adjacent boom sections and in which the two outer boom sections are substantially longer than the center boom section, said center section being generally transverse to the direction of travel of the drawbar,
(b) ground engagable wheel means for supporting said boom sections out of contact with the ground,
(c) first coupling means for coupling the center section of the boom to an associated tractor,
(d) releasable second coupling means to couple the outer sections to the said first coupling means and retain said outer sections generally transverse to the direction of travel of the drawbar when in the working or field position and in the non-working position,
(e) a plurality of frame members attached to each of said sections and directed generally rearwardly of said sections when in the field or working position,
(f) a plurality of harrows each attached to a said section by means of at least one of said frame members and adapted to be in contact with the ground when in the field or working position,
(g) a plurality of packers each attached to said frame members by a connecting means rearward of said harrows and adapted to be in contact with the ground when in field or working position,
(i) each said connecting means including a rigid connecting member freely pivotally connected at its forward end to at least one of said frame members about a first horizontal axis transverse to the direction of travel of the drawbar in the field or working position,
(ii) said connecting means also including a further free pivotal connection about an axis at its rearward end which is vertical when in the field or working position,
(h) means for pivoting said boom sections about a horizontal boom axis, generally parallel to their length and forward of the said harrows in the field or working position, to move said frame members between the working or field position in which said harrow are adapted to be in contact with the ground and the non-working position in which said harrow are adapted to be in a raised substantially upright position out of contact with the ground and in generally the same position relative to each other and the frame members,
(i) said packers and said connecting means freely pivoting about said first horizontal axis to be lifted thereby from the ground and hang rearwardly of said harrows, in said non-working position,
(ii) said pivotal connections between said boom sections including axes which are generally upright when in the non-working position so that said outer sections may pivot about said axes upon release of said releasable second coupling means from a position transverse to the direction of travel of the harrow and packer drawbar in the non-working position to a position generally parallel to the direction of travel of the harrow and packer drawbar for transport.

11. A harrow and packer drawbar as claimed in claim 10 wherein the wheel means include a pair of wheels connected to each of said outer sections, one of which wheels is rotatable about an axis parallel to the length of said section and supports said section out of contact with the ground in the field or working position, the other of which wheels is rotatable about an axis transverse to the length of said section and supports said section out of contact with the ground in the non-working position and in the transport position.

12. A harrow and packer drawbar as claimed in claims 10 or 11 wherein said connecting means also includes at its rearward end a further free pivotal connection about a second horizontal axis which is generally parallel to the direction of travel when in the working or field position.

13. A harrow and packer drawbar as claimed in claim 12 wherein said connecting means also includes a further free pivotal connection at its rearward end about a third horizontal axis which is generally transverse to the direction of travel when in the working or field position.

14. A harrow and packer drawbar as claimed in claim 13 wherein said free pivotal connection about said third axis includes means for restricting relative movement to prevent said connecting means from contacting the ground.

15. A harrow and packer drawbar as claimed in claim 10 or 11 wherein adjacent ones of said packers are trailed at different distances behind the associated boom to allow said packers to cover completely the working width of the drawbar.

16. A harrow and packer drawbar as claimed in claim 15 wherein alternate ones of said connecting means have a first length and the remaining ones are of a second and different length.

17. A harrow and packer drawbar as claimed in claim 15 wherein alternate ones of said frame members have a first length and the remaining ones are of a second and different length.

18. A harrow and packer drawbar as claimed in claim 17 wherein alternate ones of said connecting means have a first length and the remaining ones are of a second and different length and the shorter connecting means are connected to shorter ones of said frame members.

19. A harrow and packer drawbar as claimed in claim 10 wherein the said pivotal connection between the said sections is a torque-transmitting universal pivot.

20. A harrow and packer drawbar as claimed in claim 19 wherein the wheel means include a pair of wheels connected to each of said outer sections, one of which wheels is rotatable about an axis parallel to the length of said section and supports said section out of contact with the ground in the field or working position, the other of which wheels is rotatable about an axis transverse to the length of said section and supports said section out of contact with the ground in the non-working position and in the transport position.

21. A harrow and packer drawbar as claimed in claims 19 or 20 wherein said connecting means also includes at its rearward end a further free pivotal connection about a second horizontal axis which is generally parallel to the direction of travel when in the working or field position.

22. A harrow and packer drawbar as claimed in claim 21 wherein said connecting means also includes a further free pivotal connection at its rearward end about a third horizontal axis which is generally transverse to the direction of travel when in the working or field position.

23. A harrow and packer drawbar as claimed in claim 22 wherein said free pivotal connection about said third axis includes means for restricting relative movement to prevent said connecting means for contacting the ground.

24. A harrow and packer drawbar as claimed in claims 19 or 20 wherein adjacent ones of said packers are trailed at different distances behind the associated boom to allow said packers to cover completely the working width of the drawbar.

25. A harrow and packer drawbar as claimed in claim 24 wherein alternate ones of said connecting means have a first length and the remaining ones are of a second and different length.

26. A harrow and packer drawbar as claimed in claim 24 wherein alternate ones of said frame members have a first length and the remaining ones are of a second and different length.

27. A harrow and packer drawbar as claimed in claim 26 wherein alternate ones of said connecting means have a first length and the remaining ones are of a second and different length and the shorter connecting means are connected to shorter ones of said frame members.

28. A drawbar adapted to be drawn across the ground comprising:
(a) a three-section boom including a center section and two outer sections with pivotal connections between the adjacent sections and in which the two outer boom sections are substantially longer than the center boom section, said center section being generally transverse to the direction of travel of the drawbar,
(b) ground engagable wheel means for supporting said boom sections out of contact with the ground,
(c) first coupling means for coupling the center section of the boom to an associated tractor,
(d) releasable second coupling means to couple the outer sections to the said first coupling means and retain said outer sections generally transverse to the direction of travel of the drawbar when in the working or field position and in the non-working position,
(e) a plurality of frame members attached to each of said sections and directed generally rearwardly of said sections when in the field of working position,
(f) a plurality of first soil working devices each attached to a said section by means of at least one of said frame members and adapted to be in contact with the ground when in the field or working position,
(g) a plurality of second soil working devices each attached to said frame members by a connecting means rearward of said first soil working devices and adapted to be in contact with the ground when in field or working position, said connecting means having a length at least a substantial portion of the length of the frame members,
 (i) each said connecting means including a rigid connecting member freely pivotally connected at its forward end to at least one of said frame members about a first horizontal axis transverse to the direction of travel of the drawbar in the field or working position,
 (ii) said connecting means also including a further free pivotal connection about an axis at its rearward end which is vertical when in the field or working position,
(h) means for pivoting said boom sections about a horizontal boom axis, generally parallel to their length and forward of said first soil working devices in the field or working position, to move said free members between the working or field position in which said first soil working devices are adapted to be in contact with the ground and the non-working position in which said first soil working devices are adapted to be in a raised substantially upright position out of contact with the ground and in generally the same position relative to each other and the frame members,
 (i) said second soil working devices and said connecting means freely pivoting about said frist horizontal axis to be lifted thereby from the ground and hang rearwardly of said first soil working devices, in said non-working position,
 (ii) said pivotal connection between said boom sections including axes which are generally upright when in the non-working position so that said outer sections may pivot about said axes upon release of said releasable second coupling means from a position transverse to the direction of travel of the drawbar in the non-working position to a position generally parallel to the direction of travel of the drawbar for transport.

29. A drawbar as claimed in claim 28 wherein the wheel means include a pair of wheels connected to each of said outer sections, one of which wheels is rotatable about an axis parallel to the length of said section and supports said section out of contact with the ground in the field or working position, the other of which wheels is rotatable about an axis transverse to the length of said section and supports said section out of contact with the ground in the non-working position and in the transport position.

30. A drawbar as claimed in claims 28 or 29 wherein said connecting means also includes at its rearward end a further free pivotal connection about a second horizontal axis which is generally parallel to the direction of travel when in the working or field position.

31. A drawbar as claimed in claim 30 wherein said connecting means also incudes a further free pivotal connection at its rearward end about a third horizontal axis which is generally transverse to the direction of travel when in the working or field position.

32. A drawbar as claimed in claim 31 wherein said free pivotal connection about said third axis includes means for restricting relative movement to prevent said connecting means from contacting the ground.

33. A drawbar as claimed in claim 28 or 29 wherein adjacent ones of said second soil working devices are trailed at different distances behind the associated boom to allow said second soil working devices to cover completely the working width of the drawbar.

34. A drawbar as claimed in claim 33 wherein alternate ones of said connecting means have a first length and the remaining ones are of a second and different length.

35. A drawbar as claimed in claim 33 wherein alternate ones of said frame members have a first length and the remaining ones are of a second and different length.

36. A drawbar as claimed in claim 35 wherein alternate ones of said connecting means have a first length and the remaining ones are of a second and different length and the shorter connecting means are connected to shorter ones of said frame members.

37. A harrow and packer drawbar adapted to be drawn across the ground comprising:
(a) a three-section boom including a center section and two outer sections with pivotal connections between the adjacent boom sections and in which the two outer boom sections are substantially longer than the center section, said center section being generally transverse to the direction of travel of the drawbar,
(b) ground engagable wheel means for supporting said boom section out of contact with the ground,
(c) first coupling means for coupling the center section of the boom to an associated tractor,
(d) releasable second coupling means to couple the outer sections to the said first coupling means and retain said outer sections generally transverse to the direction of travel of the drawbar when in the working or field position and in the nonworking position,
(e) a plurality of frame members attached to each of said sections and directed generally rearwardly of said sections when in the field or working position,
(f) a plurality of harrows each attached to a said section by means of at least one of said frame members and adapted to be in contact with the ground when in field or working position,
(g) a plurality of packers each attached to said frame members by a connecting means rearward of said harrows and adapted to be in contact with the ground when in the field or working position, said connecting means having a length at least a substantial portion of the length of the frame members,
 (i) each said connecting means including a rigid connecting member freely pivotally connected at its forward end to at least one of said frame members about a first horizontal axis transverse to the direction of travel of the drawbar in the field or working position,
 (ii) said connecting means also including a further free pivotal connection about an axis at its rearward end which is vertical when in the field or working position,
(h) means for pivoting said boom sections about a horizontal boom axis, generally parallel to their length and forward of the said harrows in the field or working position, to move said frame members between the working or field position in which said harrows are adapted to be in contact with the ground and the non-working position in which said harrows are adapted to be in a raised substantially upright position out of contact with the ground and in generally the same position relative to each other and the frame members,
 (i) said packers and said connecting means freely pivoting about said first horizontal axis to be lifted thereby from the ground and hang rearwardly of said harrows, in said non-working position,
 (ii) said pivotal connections between said boom sections including axes which are generally upright when in the non-working position so that said outer sections may pivot about said axes upon release of said releasable second coupling means from a position transverse to the direction of travel of the harrow and packer drawbar in the non-working position to a position generally parallel to the direction of travel of the harrow and packer drawbar for transport.

38. A harrow and packer drawbar as claimed in claim 37 wherein the wheel means include a pair of wheels connected to each of said outer sections one of which wheels is rotatable about an axis parallel to the length of siad section and supports said section out of contact with the ground in the field or working position, the other of which wheels is rotatable about an axis transverse to the length of said section and supports said section out of contact with the ground in the non-working position and in the transport position.

39. A harrow and packer drawbar as claimed in claims 37 or 38 wherein said connecting means also includes at its rearward end a further free pivotal connection about a second horizontal axis which is generally parallel to the direction of travel when in the working or field position.

40. A harrow and packer drawbar as claimed in claim 34 wherein said connecting means also includes a further free pivotal connection at its rearward end about a third horizontal axis which is generally transverse to the direction of travel when in the working or field position.

41. A harrow and packer drawbar as claimed in claim 40 wherein said free pivotal connection about said third axis includes means for restricting relative movement to prevent said connecting means for contacting the ground.

42. A harrow and packer drawbar as claimed in claims 37 or 38 wherein adjacent ones of said packers are trailed at different distances behind the associated boom to allow said packers to cover completely the working width of the drawbar.

43. A harrow and packer drawbar as claimed in claim 42 wherein alternate ones of said connecting means have a first length and the remaining ones are of a second and different length.

44. A harrow and packer drawbar as claimed in claim 42 wherein alternate ones of said frame members have a first length and the remaining ones are of a second and different length.

45. A harrow and packer drawbar as claimed in claim 44 wherein alternate ones of said connecting means have a first length and the remaining ones are of a second and different length and the shorter connecting means are connected to shorter ones of said frame members.

46. A harrow and packer drawbar as claimed in claim 37 wherein the said pivotal connection between the said sections is a torque-transmitting universal pivot.

47. A harrow and packer drawbar as claimed in claim 46 wherein the wheel means include a pair of wheels connected to each of said outer sections, one of which wheels is rotatable about an axis parallel to the length of said section and supports said second out of contact with the ground in the field or working position, the other of which wheels is rotatable about an axis transverse to the length of said section and supports said section out of contact with the ground in the non-working position and in the transport position.

48. A harrow and packer drawbar as claimed in claims 46 to 47 wherein said connecting means also includes at its rearward end a further free pivotal connection about a second horizontal axis which is generally parallel to the direction of travel when in the working or field position.

49. A harrow and packer drawbar as claimed in claim 48 wherein said connecting means also includes a further free pivotal connection at its rearward end about a third horizontal axis which is generally transverse to the direction of travel when in the working or field position.

50. A harrow and packer drawbar as claimed in claim 49 wherein said free pivotal connection about said third axis includes means for restricting relative movement to prevent said connecting means from contacting the ground.

51. A harrow and packer drawbar as claimed in claims 46 or 47 wherein adjacent ones of said packers are trailed at different distances behind the associated boom to allow said packers to cover completely the working width of the drawbar.

52. A harrow and packer drawbar as claimed in claim 51 wherein alternate ones of said connecting means have a first length and the remaining ones are of a second and different length.

53. A harrow and packer drawbar as claimed in claim 51 wherein alternate ones of said frame members have a first length and the remaining ones are of a second and different length.

54. A harrow and packer drawbar as claimed in claim 53 wherein alternate ones of said connecting means have a first length and the remaining ones are of a second and different length and the shorter connecting means are connected to shorter ones of said frame members.

55. A drawbar adapted to be drawn across the ground comprising:
(a) a boom having at least two sections pivotally connected together at adjacent ends thereof, said boom sections being transverse to the direction of travel of the drawbar when they are in a working position,
(b) ground engagable wheel means for supporting said boom sections out of contact with the ground,
(c) first coupling means for coupling a central portion of the boom to an associated tractor,
(d) releasable section coupling means to couple the outer ends of the boom to the first coupling means and to retain the boom transverse to the direction of travel of the drawbar when in the working position,
(e) a plurality of frame members attached to each of said sections and directed generally rearwardly of said sections when in the working position, each said frame member being capable of drawing and supporting an associated first soil working device which is attachable to a said section by means of said frame member and adapted to be in contact with the ground when in the working position to provide substantially complete coverage of the ground,
(f) a plurality of connecting means each including
(i) a rigid connecting member freely pivotally connected at its forward end to a respective one of said frame members rearwardly thereof to pivot about a first horizontal axis transverse to the direction of travel of the drawbar in working position, and
(ii) a further free pivotal connection about an axis at the rearward end of each said connecting means which axis is vertical when the frame member is in working position,
said connecting means each being adapted to draw an associated second soil working device across the ground in contact therewith for substantially complete coverage of the ground in working position and support it out of contact with the ground in non-working position,
(g) means for pivoting said boom sections about a horizontal boom axis, generally parallel to their length and forward of said frame members in working position, to move said frame members between
(i) the working position, in which any said first soil working devices attached thereto are adapted to be in contact with the ground, and
(ii) a non-working position in which any said first soil working devices are adapted to be in a raised substantially upright position out of contact with the ground and generally in the same position relative to each other and the frame members,
said connecting means freely pivoting about said first horizontal axes at the connections with their respective frame members, to be lifted thereby and raise any said second soil working devices from the ground to hand rearwardly of any said first soil working devices in said non-working position, said pivotal connections at adjacent ends of said sections including at least one axis which is generally upright when in the non-working position so that the other ends of said sections may pivot about said axes upon release of said releasable second coupling means from a position transverse to the direction of travel of the drawbar in the non-working position to a position generally parallel to the direction of travel of the drawbar for transport.

56. A drawbar adapted to be drawn across the ground comprising:
(a) a boom having at least two sections pivotally connected together at adjacent ends thereof, said boom sections being transverse to the direction of travel of the drawbar when they are in working position,
(b) ground engagable wheel means for supporting said boom sections of contact with the ground,
(c) first coupling means for coupling a central portion of the boom to an associated tractor,
(d) releasable second coupling means to couple the outer ends of the boom to the first coupling means and to retain the boom transverse to the direction of travel of the drawbar when in the working position, (e) a plurality of frame members attached to each of said sections and directed generally rearwardly of said sections when in the working position, each said frame member being capable of drawing and supporting an associated first soil working device which is attachable to a said section by means of said frame member and adapted to be in contact with the ground when in the working position, to provide substantially complete coverage of the ground, (f) a plurality of connecting means each including
   (i) a rigid connecting member freely pivotally connected at its forward end to a respective one of said frame members rearwardly thereof to pivot about a first horizontal axis transverse to the direction of travel of the drawbar in working position, and
   (ii) a further free pivotal connection about an axis at the rearward end of each said connecting means which axis is vertical when the frame member is in working position, said connecting means each being adapted to draw an associated second soil working device across the ground in contact therewith for substantially complete coverage of the ground in working position and support it out of contact with the ground in non-working position, said frame members and corresponding connecting means adjacent the pivotally connected boom sections being of different lengths so that adjacent ones of any said second soil working devices attached thereto are trailed at different distances behind the boom in working position and do not interfere one with the other upon folding of the boom sections, (g) means for pivoting said boom sections about a horizontal boom axis, generally parallel to their length and forward of said frame members in working position, to move said frame members between
   (i) the working position, in which any said first soil working devices attached thereto are adapted to be in contact with the ground, and
   (ii) a non-working position in which any said first soil working devices are adapted to be in a raised substantially upright position out of contact with the ground and generally in the same position relative to each other and the frame members, said connecting means freely pivoting about said first horizontal axes at the connections with their respective frame members, to be lifted thereby and to raise any said second soil working devices from the ground to hang rearwardly of any said first soil working devices in said non-working position, said pivotal connections at adjacent ends of said sections including at least one axis which is generally upright when in the non-working position so that the outer ends of said sections may pivot about said axes upon release of said releasable second coupling means from a position transverse to the direction of travel of the drawbar in the non-working position to a position generally parallel to the direction of travel of the drawbar for transport.

57. A drawbar adapted to be drawn across the ground comprising:
(a) a three section boom including a center section and two outer sections with the adjacent boom sections pivotally connected together at adjoining ends thereof, the two outer sections being substantially longer than the center section and said boom sections being transverse to the direction of travel of the drawbar when they are in working position, (b) ground engagable wheel means for supporting said boom sections out of contact with the ground, (c) first coupling means for coupling the center section of the boom to an associated tractor, (d) releasable second coupling means to couple the outer sections of the boom to the first coupling means and to retain the boom transverse to the direction of travel of the drawbar when in the working position, (e) a plurality of frame members attached to each of said sections and directed generally rearwardly of said sections when in the working position, each said frame member being capable of drawing and supporting an associated first soil working device which is attachable to a said section by means of said frame member and adapted to be in contact with the ground when in the working position to provide substantially complete coverage of the ground, (f) a plurality of connecting means each including
   (i) a rigid connecting member freely pivotally connected at its forward end to a respective one of said frame members rearwardly thereof to pivot about a first horizontal axis transverse to the direction of travel of the drawbar in working position, and
   (ii) a further free pivotal connection about an axis at the rearward end of each said connecting means which axis is vertical when the frame member is in working position, said connecting means each being adapted to draw an associated second soil working device across the ground in contact therewith for substantially complete coverage of the ground in working position and support it out of contact with the ground in non-working position, (g) means for pivoting said boom sections about a horizontal boom axis, generally parallel to their length and forward of said frame members in working position, to move said frame members between
   (i) the working position, in which any said first soil working devices attached thereto are adapted to be in contact with the ground, and
   (ii) a non-working position in which any said first said working devices are adapted to be in a raised substantially upright position out of contact with the ground and generally in the same position relative to each other and the frame members, said connecting means freely pivoting about said first horizontal axes at the connections with their respective frame members, to be lifted thereby and to raise any said second soil working devices from the ground to hang rearwardly of said first soil working devices in said non-working position, the pivotal connections at adjoining ends of said boom sections each including at least one axis which is generally upright when in the non-working position so that the outer said sections may pivot about said axes upon release of said releasable second coupling means from a position transverse to the direction of travel of the drawbar in the non-working position to a position generally parallel to the direction of travel of the drawbar for transport.

58. A drawbar adapted to be drawn across the ground comprising:

(a) a three section boom including a center section and two outer sections with the adjacent sections pivotally connected together at adjoining ends thereof, the two outer sections being substantially longer than the center section and said boom sections being transverse to the direction of travel of the drawbar when they are in working position, (b) ground engagable wheel means for supporting said boom sections out of contact with the ground, (c) first coupling means for coupling the center section of the boom to an associated tractor, (d) releasable second coupling means to couple the outer sections of the boom to the first coupling means and to retain the boom transverse to the direction of travel of the drawbar when in the working position, (e) a plurality of frame members attached to each of said sections and directed generally rearwardly of said sections when in the working position, each said frame member being capable of drawing and supporting an associated first soil working device which is attachable to a said section by means of said frame member and adapted to be in contact with the ground when in the working position, to provide substantially complete coverage of the ground, (f) a plurality of connecting means each including
  (i) a rigid connecting member freely pivotally connected at its forward end to a respective one of said frame members rearwardly thereof to pivot about a first horizontal axis transverse to the direction of travel of the drawbar in working position and
  (ii) a further free pivotal connection about an axis at the rearward end of each said connecting means which axis is vertical when the frame member is in working position, said connecting means each being adapted to draw an associated second soil working device across the ground in contact therewith for substantially complete coverage of the ground in working position and support it out of contact with the ground in non-working position, said frame members and corresponding connecting means adjacent the pivotally connected boom sections being of different lengths so that adjacent ones of any said second soil working devices attached thereto are trailed at different distances behind the associated tractor in working position and do not interfere one with the other upon folding of the boom sections, (g) means for pivoting said boom sections about a horizontal boom axis, generally parallel to their length and forward of said frame members in working position, to move said frame members between
  (i) the working position, in which any said first soil working devices attached thereto are adapted to be in contact with the ground, and
  (ii) a non-working position in which any said first soil working devices are adapted to be in a raised substantially upright position out of contact with the ground and generally in the same position relative to each other and the frame members, said connecting means freely pivoting about said first horizontal axes at the connections with their respective frame members, to be lifted thereby and to raise any said second soil working devices from the ground to hang rearwardly of said first soil working devices in said non-working position, the pivotal connections at adjoining ends of said boom sections each including at least one axis which is generally upright when in the non-working position so that the outer said sections may pivot about said axes upon release of said releasable second coupling means from a position transverse to the direction of travel of the drawbar in the non-working position to a position generally parallel to the direction of travel of the drawbar for transport.

* * * * *